(12) United States Patent
Kudva et al.

(10) Patent No.: US 10,601,324 B1
(45) Date of Patent: Mar. 24, 2020

(54) SWITCHED TANK-TRANSFORMER BASED HIGH STEP-DOWN RATIO DC-DC CONVERTER

(71) Applicant: NVIDIA Corp., Santa Clara, CA (US)

(72) Inventors: Sudhir Shrikantha Kudva, Dublin, CA (US); Ahmed Abou-Alfotouh, Dublin, CA (US); Nikola Nedovic, San Jose, CA (US); John Poulton, Chapel Hill, NC (US)

(73) Assignee: NVIDIA Corp., Santa Clara, CA (US)

( * ) Notice: Subject to any disclaimer, the term of this patent is extended or adjusted under 35 U.S.C. 154(b) by 0 days.

(21) Appl. No.: 16/387,383

(22) Filed: Apr. 17, 2019

(51) Int. Cl.
 *H02M 3/335* (2006.01)
 *H02M 3/158* (2006.01)

(52) U.S. Cl.
 CPC ..... *H02M 3/1588* (2013.01); *H02M 3/33592* (2013.01)

(58) Field of Classification Search
 CPC ........... H02M 3/1588; H02M 3/33592; H02M 3/33356; H02M 2001/123
 USPC ...... 363/16, 17, 21.02, 21.03, 124, 131, 132
 See application file for complete search history.

(56) References Cited

U.S. PATENT DOCUMENTS

| | | | |
|---|---|---|---|
| 4,757,432 A * | 7/1988 | Hancock | H02M 7/53871 363/17 |
| 5,073,849 A | 12/1991 | Morris | |
| 5,245,520 A * | 9/1993 | Imbertson | H02M 3/337 363/132 |
| 6,388,896 B1 | 5/2002 | Cuk | |
| 8,842,450 B2 * | 9/2014 | Jungreis | H02M 3/33569 363/21.03 |
| 9,502,987 B1 * | 11/2016 | Feno | H02M 3/33546 |
| 9,837,918 B2 * | 12/2017 | Ye | H02M 3/33569 |
| 2001/0024373 A1 | 9/2001 | Cuk | |
| 2004/0114397 A1 | 6/2004 | Liu et al. | |
| 2006/0213890 A1 * | 9/2006 | Kooken | B23K 9/095 219/130.21 |
| 2007/0103941 A1 | 5/2007 | Liu et al. | |
| 2009/0243388 A1 | 10/2009 | Kim et al. | |
| 2010/0232189 A1 | 9/2010 | Reilly | |
| 2011/0026282 A1 | 2/2011 | Chapman et al. | |
| 2012/0074949 A1 | 3/2012 | Kepley | |
| 2012/0147629 A1 * | 6/2012 | Mao | H02M 3/28 363/17 |
| 2013/0027982 A1 | 1/2013 | Chapman et al. | |

OTHER PUBLICATIONS

Bo Yang, Topology Investigation for Front End DC/DC Power Conversion for Distributed Power System, Dissertation, Sep. 12, 2003, Blacksburg, Virginia United States.
Shuai Jiang, Chenhao Nan, Xin Li, Chee Chung, Mobashar Yazdani, Switched Tank Converters, article, 2018, Mountain View CA United States.

* cited by examiner

*Primary Examiner* — Rajnikant B Patel
(74) *Attorney, Agent, or Firm* — Rowan TELS LLC (57) ABSTRACT

A DC-DC converter circuit includes a switched tank converter configured to output a switching waveform. The DC-DC converter circuit further includes a transformer coupled to the switched tank converter to receive the switching waveform output by the switched tank converter across a primary winding of the transformer.

17 Claims, 14 Drawing Sheets

SWITCHED TANK-TRANSFORMER BASED HIGH STEP-DOWN RATIO DC-DC CONVERTER

BACKGROUND

High input signal voltages (e.g., 40V –60V) to integrated circuit devices such as graphics processing units (GPUs) are becoming more common because these higher voltages enable power delivery in an efficient manner. Input signals at these levels require high-ratio point-of-load converters which can be small enough to fit on an integrated circuit device. Various high-ratio converters are known, such as switched tank converters (STCs) and transformer-based DC-DC converters, where DC refers to direct current.

Figure 1:
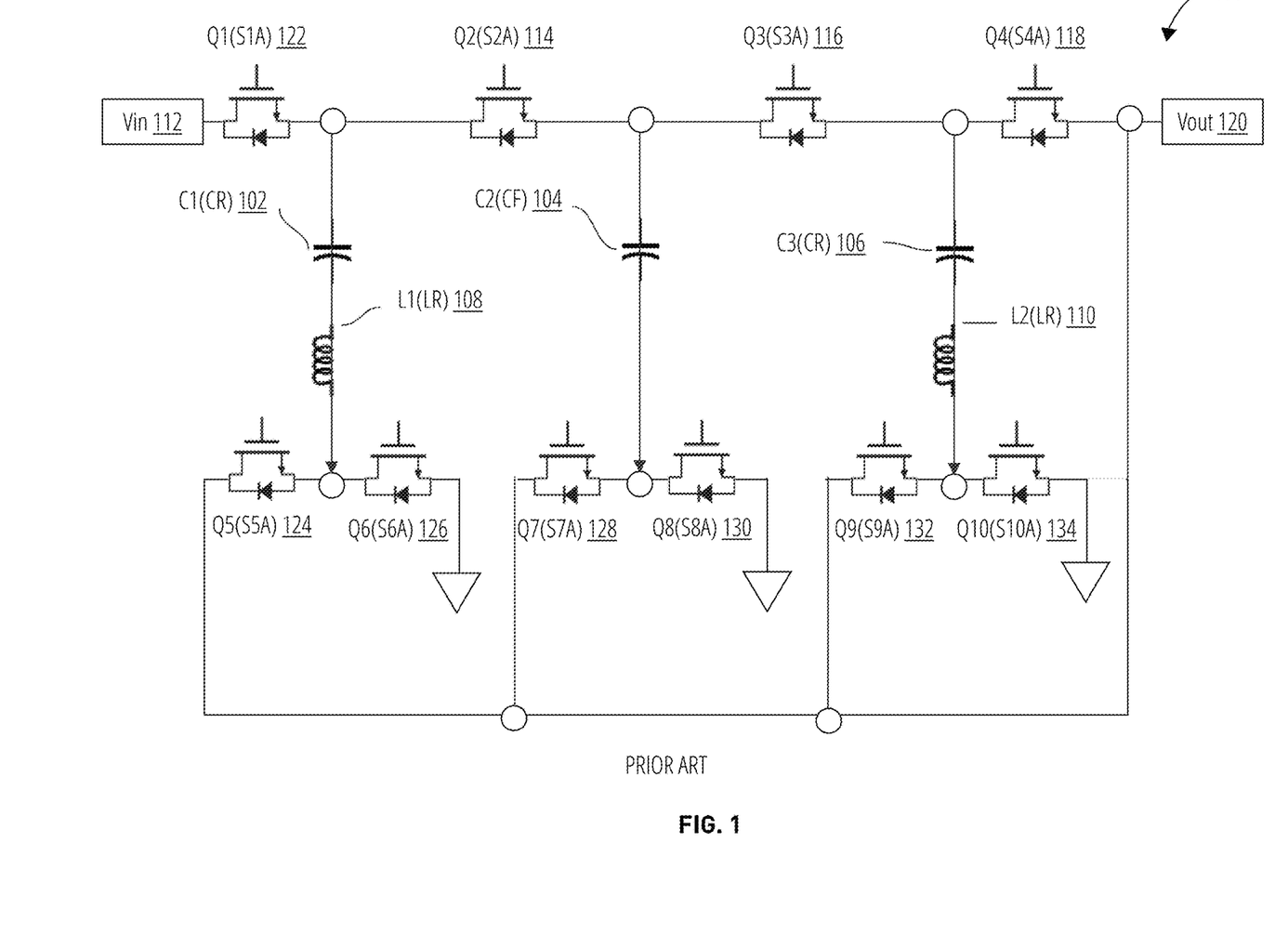
FIG. 1 illustrates an example of a switched tank converter 100.

A switched tank converter includes capacitors and inductors to convert energy from one voltage level to another. FIG. 1 shows an example of a switched tank converter 100 having a 4:1 conversion ratio ($V_{out}=V_{in}/4$). The tank circuit portion of the switched tank converter is designed to have a resonant frequency close to the switching frequency. Switching losses are reduced by implementing zero current switching.

A transformer-based high-step-down-ratio converter utilizes a transformer to achieve a high-step-down-ratio. A full-bridge circuit or half-bridge circuit is used to invert a DC input signal voltage into a switching waveform. At the transformer secondary winding, either a full bridge circuit or a center-tapped transformer may be used to achieve synchronous rectification, as shown in the transformer-based converter 200 of FIG. 2. The conversion ratio that is provided is equal to the transformer turns ratio of N:1 ($V_{out}=V_{in}/N$).

Drawbacks are associated with both of the approaches described. A switched tank converter requires many components to achieve a high conversion ratio. For example, if the conversion ratio is increased to 6:1, then another stage must be added. Such an additional stage further increases the circuit component count.

With regards to a transformer-based converter, the size of the transformer increases with an increase in the turns ratio to achieve the desired conversion ratio. This results in an increase in the circuit area as well as in core losses in the transformer. Core losses are proportional to the volume of the transformer.

BRIEF SUMMARY

Aspects of the present disclosure are directed to providing and/or controlling a high ratio DC-DC converter that includes an interleaved switched tank converter coupled to a transformer.

According to various aspects, a circuit component count (e.g., a total switch count) may be reduced. In addition (or alternatively), zero current switching is used to reduce switching losses, and synchronous rectification is used at the output of the DC-DC converter to generate a stable DC signal.

According to at least one embodiment, a DC-DC converter circuit includes a switched tank converter configured to output a switching waveform. The DC-DC converter circuit further includes a transformer coupled to the switched tank converter to receive the switching waveform output by the switched tank converter across a primary winding of the transformer.

According to at least one embodiment, a system includes a DC-DC converter configured to receive an input signal and generate an output signal. The DC-DC converter includes a switched tank converter configured to output a switching waveform, and a transformer coupled to the switched tank converter to receive the switching waveform output by the switched tank converter across a primary winding of the transformer. The system further includes a synchronous rectifier coupled to the DC-DC converter and configured to rectify the output signal generated by the DC-DC converter. The system further includes an integrated circuit (IC) device coupled to the synchronous rectifier to receive the rectified output signal.

According to at least one embodiment, a method of operating a converter circuit including a switched tank converter and a transformer coupled to the switched tank converter is disclosed. The method involves receiving an input signal at the switched tank converter and during a first phase, controlling the switched tank converter to apply a voltage of a first polarity across a primary winding of the transformer. The method further involves, during a second phase, controlling the switched tank converter to apply a voltage of a second polarity across the primary winding of the transformer, wherein the second polarity is opposite of the first polarity and providing an output signal at a secondary winding of the transformer.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

FIG. 1 illustrates an example of a switched tank converter 100. The switched tank converter 100 includes tank circuits. Each of the tank circuits includes an inductor and a capacitor (e.g., resonant capacitor 102 and inductor 108, and resonant capacitor 106 and inductor 110). The tank circuits are used for transferring energy from one voltage level (e.g., voltage input 112) to another (e.g., voltage output 120). The switched tank converter 100 of FIG. 1 has a conversion ratio of 4:1 ($V_{out}=V_{in}/4$). The tank circuits are designed to have a resonant frequency that is close to a switching frequency. Switching losses are reduced by implementing zero current switching (ZCS).

A resonant building block performs a resonant operation in which the resonant building block generates a resonant current by switching approximately at the resonant frequency. With reference to FIG. 1, an example of a resonant building block includes switch 122, switch 114, resonant capacitor 102, inductor 108, switch 124, and switch 126. Another example of a resonant building block includes switch 116, switch 118, resonant capacitor 106, inductor 110, switch 132, and switch 134.

A non-resonant building block is also included in the switched tank converter 100. The non-resonant building block stabilizes the voltage of the input and output terminals by coupling a filtering capacitor (e.g., filtering capacitor 104) to ground or to another stable voltage. With continued reference to FIG. 1, an example of a non-resonant building block includes filtering capacitor 104, switch 128, and switch 130. The non-resonant building block may separate the earlier-described resonant building blocks from each other.

Figure 2:
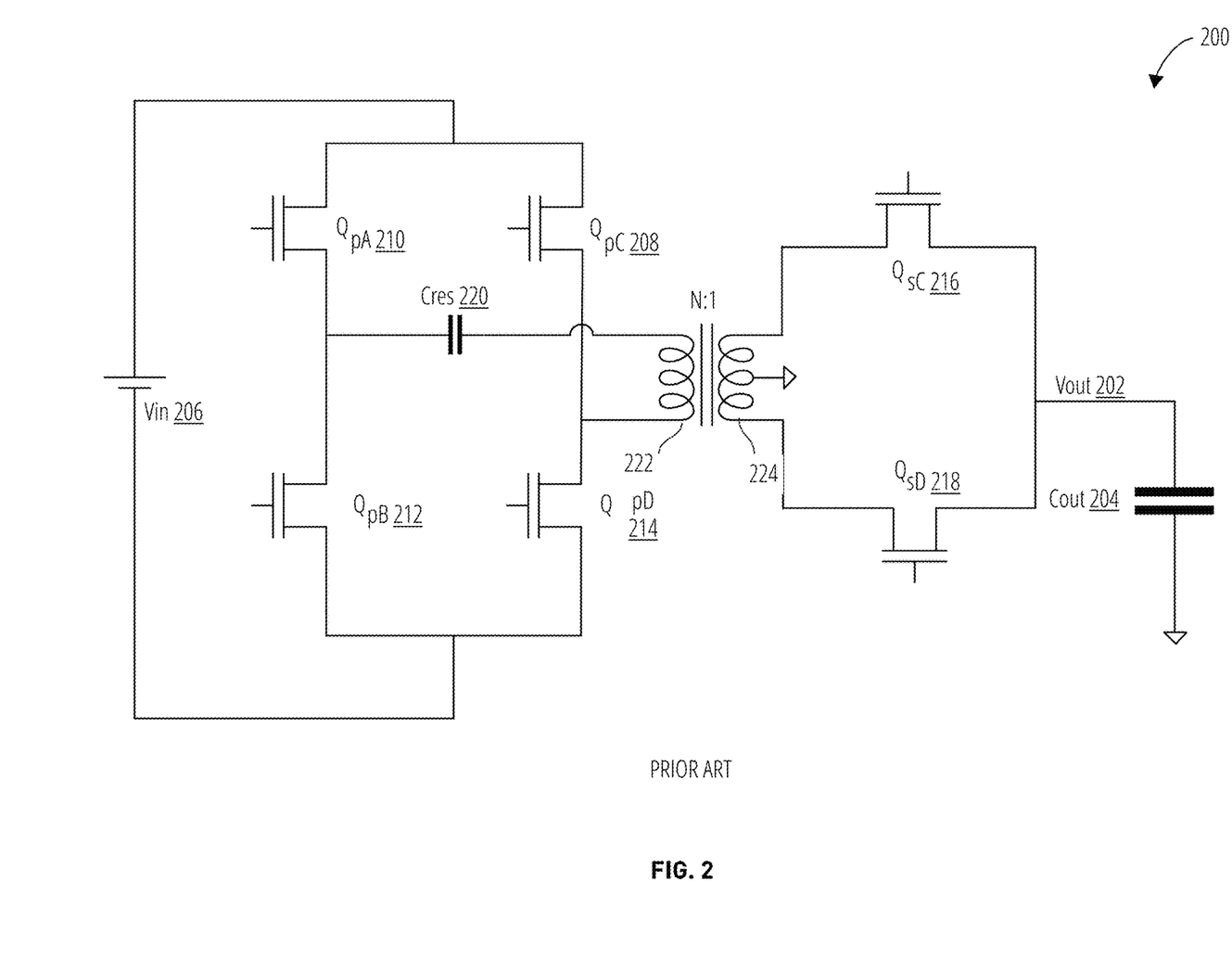
FIG. 2 illustrates an example of a transformer-based converter 200.

FIG. 2 illustrates an example of a transformer-based converter 200. A full-bridge circuit or half-bridge circuit is used to invert a DC input signal voltage (e.g., voltage input 206) into a switching waveform. With reference to FIG. 2, a full bridge circuit includes a branch including switch 210 and switch 212 coupled in parallel with a branch including switch 208 and switch 214. The branches are bridged by a capacitor 220 providing resonance with the leakage inductance of the transformer and a transformer primary winding 222. The switch 210, switch 212, switch 208, and switch 214 are controllable to couple the voltage input 206 to the transformer primary winding 222. An output signal (e.g., voltage output 202) is provided by the transformer secondary winding 224 via the switch 216 and the switch 218, and the capacitor 204.

A transformer formed by the transformer primary winding 222 and the transformer secondary winding 224 is used to achieve high step-down ratio. The conversion ratio of the transformer is equal to the transformer turns ratio which is N:1 ($V_{out}=V_{in}/N$). At the transformer secondary winding 224, either a full bridge or a center tapped transformer (as illustrated in FIG. 2) can be used to achieve synchronous rectification.

Figure 3:
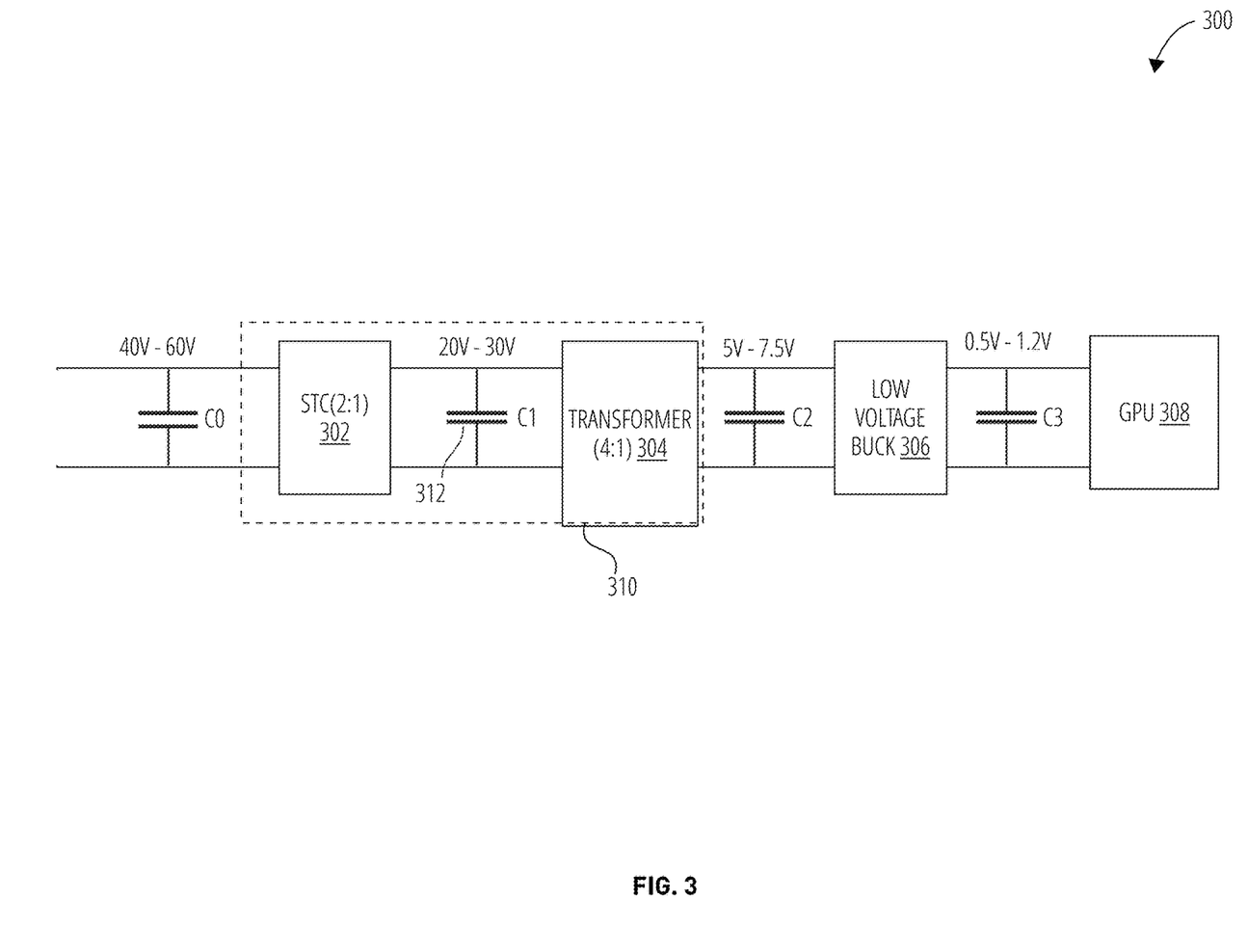
FIG. 3 illustrates a system 300 in accordance with one embodiment.

FIG. 3 illustrates a simplified block diagram of a system 300 according to at least one embodiment. The system 300 includes a switched tank transformer converter 310. The switched tank transformer converter 310 includes a switched tank converter 302 coupled to a transformer 304.

The switched tank converter 302 stage outputs a DC voltage which is then converted to a switching waveform in the transformer 304 stage. A capacitor 312 (C1) is utilized between the stages to hold the DC voltage level output by the switched tank converter 302. The output signal provided by the switched tank transformer converter 310 is rectified by the synchronous rectifier 306. The rectified output is provided to an integrated circuit such as a GPU 308. The system 300 is inefficient due to the multiple conversions back and forth between DC and a switching waveform.

Figure 4:
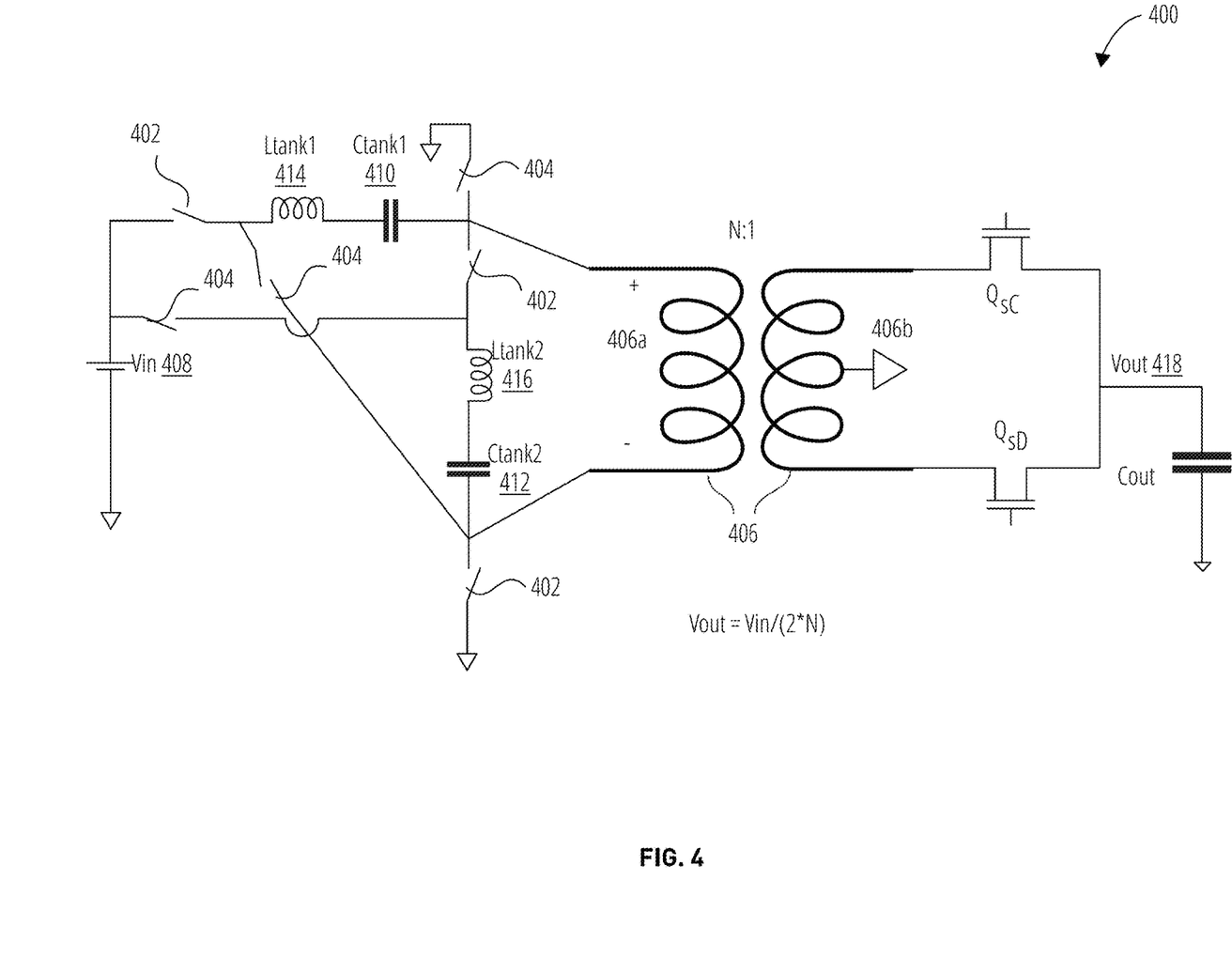
FIG. 4 illustrates a switch tank transformer DC-DC converter 400 in accordance with at least one embodiment.

A more advantageous solution combines the switched tank converter and the subsequent transformer stage by generating a switching waveform in the switched tank converter stage that is directly fed to the transformer winding. As will be described in more detail with reference to FIG. 4 and FIG. 5, in addition to providing a portion of a conversion ratio the switched tank converter may output a switching waveform. The switching waveform is applied across a primary winding of the subsequent transformer. The transformer provides a remaining portion of the conversion ratio FIG. 4 illustrates a switch tank transformer DC-DC converter 400 according to at least one embodiment. The switch tank transformer DC-DC converter 400 reduces the overall component count and/or the need for an increased turns ratio in the transformer 304. For example, the switch tank transformer DC-DC converter 400 includes an interleaved two-phase switched tank converter and a transformer in a manner that reduces the number of switches utilized from fourteen (e.g., if the switched tank converter 302 and the transformer 304 were not so combined) to eight. Also, a need for the intermediate capacitor 312 (C1) is removed. Instead of merely directly generating a DC voltage, the switch tank transformer DC-DC converter 400 generates the switching waveform for the primary winding (406a) of the transformer 406 and also provides 2:1 down-conversion. The switch tank transformer DC-DC converter 400 draws current from an input signal during both of the two phases. Further down-conversion is achieved by the turns ratio of the transformer 406.

The switch tank transformer DC-DC converter 400 includes two tank circuits that are alternatively connected across a transformer primary winding of a transformer. The tank circuits may be switched in complementary fashion such that current is drawn during an entire clock cycle. For example, the tank circuits may be switched such that they are alternatively connected between an input signal and a positive terminal of the transformer primary winding. Accordingly, the input signal DC current is reduced.

With continued reference to FIG. 4, the switch tank transformer DC-DC converter 400 includes two tank circuits and a transformer 406 having a transformer primary winding 406a and a transformer secondary winding 406b. The transformer 406 has a turns ratio of N:1. Accordingly, when the switch tank transformer DC-DC converter 400 has a voltage input 408 of $V_{in}$, it has a voltage output 418 of $V_{out}$ that is equal (or approximately equal) to $V_{in}/(2*N)$. FIG. 4 illustrates that the transformer secondary winding 406b has a center tapped connection. However, it is understood that, alternatively, a full bridge may be used to achieve synchronous rectification.

A first tank circuit includes inductor 414 ($L_{tank1}$) and capacitor 410 ($C_{tank1}$). A second tank circuit includes inductor 416 ($L_{tank2}$) and capacitor 412 ($C_{tank2}$). The first tank circuit and the second tank circuit are alternatively connected across the transformer primary winding 406a.

The tank circuits may be switched to become coupled between an input signal (voltage input 408) and a positive terminal of the transformer primary winding 406a in different configurations. The switching is facilitated using first switches 402 and second switches 404. As will be described in more detail with reference to FIG. 5, in a first phase of operation, each of the first switches 402 is configured to be ON (closed), and each of the second switches 404 is configured to be OFF (open). Subsequently, in a second phase of operation (e.g., a complementary phase), each of the first switches 402 is configured to be ON (closed), and each of the second switches 404 is configured to be OFF (open).

Figure 5:
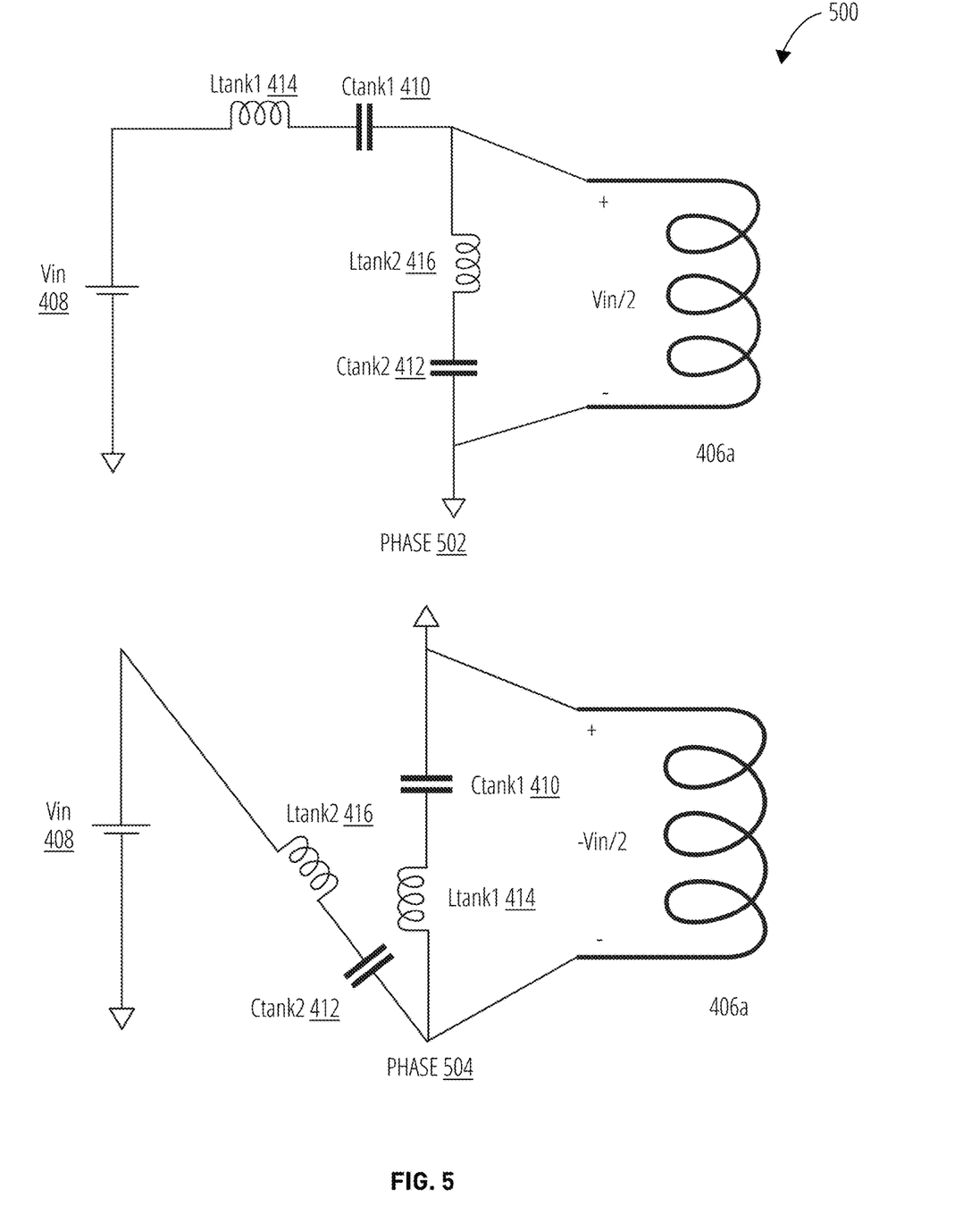
FIG. 5 illustrates phase equivalent circuits 500 for the switch tank transformer DC-DC converter 400 in accordance with at least one embodiment.

FIG. 5 illustrates phase equivalent circuits 500. One of the phase equivalent circuits 500 illustrates operation of the switch tank transformer DC-DC converter 400 during a first phase of operation (phase 502). The other of the phase equivalent circuits 500 illustrates operation of the switch tank transformer DC-DC converter 400 during a second phase of operation (phase 504). For purposes of simplicity, the first switches 402 and the second switches 404 of FIG. 4 are not explicitly shown in the phase equivalent circuits 500 of FIG. 5.

In the phase 502, each of the first switches 402 is controlled to be ON, and each of the second switches 404 is controlled to be OFF. The first tank circuit and the second tank circuit become coupled to each other as shown in the phase equivalent circuit corresponding to the phase 502. Accordingly, the voltage across the transformer primary winding 406a is equal to half of the voltage input 408 (i.e., $V_{in}/2$).

In a next phase (e.g., phase 504), each of the first switches 402 is controlled to be OFF (open), and each of the second switches 404 is controlled to be ON (closed). The first tank circuit and the second tank circuit become coupled to each other as shown in the phase equivalent circuit corresponding to the phase 504. Accordingly, the magnitude of the voltage across the transformer primary winding 406a is again equal to half of the voltage input 408 (i.e., $V_{in}/2$). However, the polarity of the voltage across the transformer primary winding 406a is the opposite of the polarity of the voltage described with respect to the phase 502. As illustrated in FIG. 5, the voltage across the transformer primary winding 406a is equal to $V_{in}/2$.

Current is drawn from the input signal (voltage input 408) during an entire clock period through the two-phase operation, which reduces the transient jumps on the input signal power supply. Properties of the tank circuits (e.g., the inductance of the inductor 414, the inductance of the inductor 416, the capacitance of the capacitor 410, and the capacitance of the capacitor 412) are chosen such that resonant frequencies of the tank circuits are equal (or approximately equal) to a switching frequency (e.g., the frequency at which the first switches 402 and the second switches 404 are controlled, so that the switched tank converter of the switch tank transformer DC-DC converter 400 alternates between operating in the phase 502 and operating in the complementary phase 504).

According to at least one particular embodiment, the current through the two interleaved tank circuits are 180° out of phase with each other. For example, if the voltage at the voltage input 408 is equal to 40V, the voltage across the transformer primary winding 406a alternates between +20V (e.g., during the phase 502) and −20V (e.g., during the complementary phase 504). As a further example, if the transformer 406 has a turns ratio of 4:1, the voltage at the voltage output 418 alternates between around +5V (e.g., during the phase 502) and around −5V (e.g., during the complementary phase 504). Utilizing the interleaved tank circuits to receive the input signal results in current being drawn during the entire cycle which reduces input signal current transients. High efficiency may be achieved over a wide power range.

Figure 6:
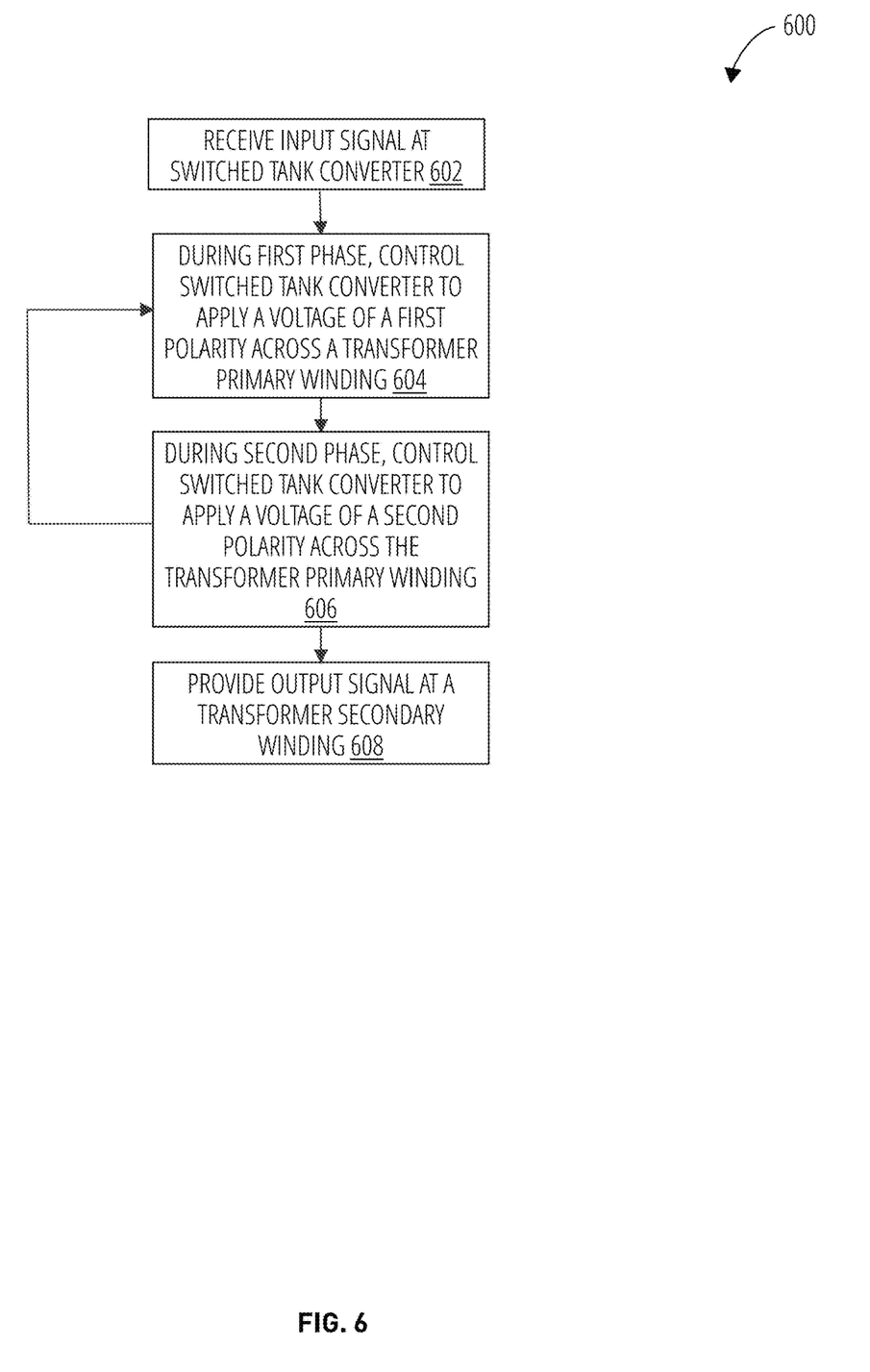
FIG. 6 illustrates a method 600 in accordance with at least one embodiment.

FIG. 6, is a flowchart of a method 600 of operating a converter circuit. At block 602, an input signal (e.g., voltage input 408) is received at a switched tank converter.

At block 604, during a first phase (e.g., phase 502), the switched tank converter is controlled to apply a voltage of a first polarity across a primary winding of a transformer (e.g., transformer 406). For example, a plurality of first switches (e.g., first switches 402) are controlled to be on, and a plurality of second switches (e.g., second switches 404) are controlled to be off.

At block 606, during a second phase (e.g., phase 504), the switched tank converter is controlled to apply a voltage of a second polarity across the primary winding of a transformer (e.g., transformer 406). The second polarity is opposite of the first polarity. For example, a plurality of first switches (e.g., first switches 402) are controlled to be off, and a plurality of second switches (e.g., second switches 404) are controlled to be on.

At block 608, during both the first phase (e.g., phase 502) and the second phase (e.g., phase 504), an output signal is provided at a secondary winding of the transformer (e.g., transformer 406).

Figure 7:
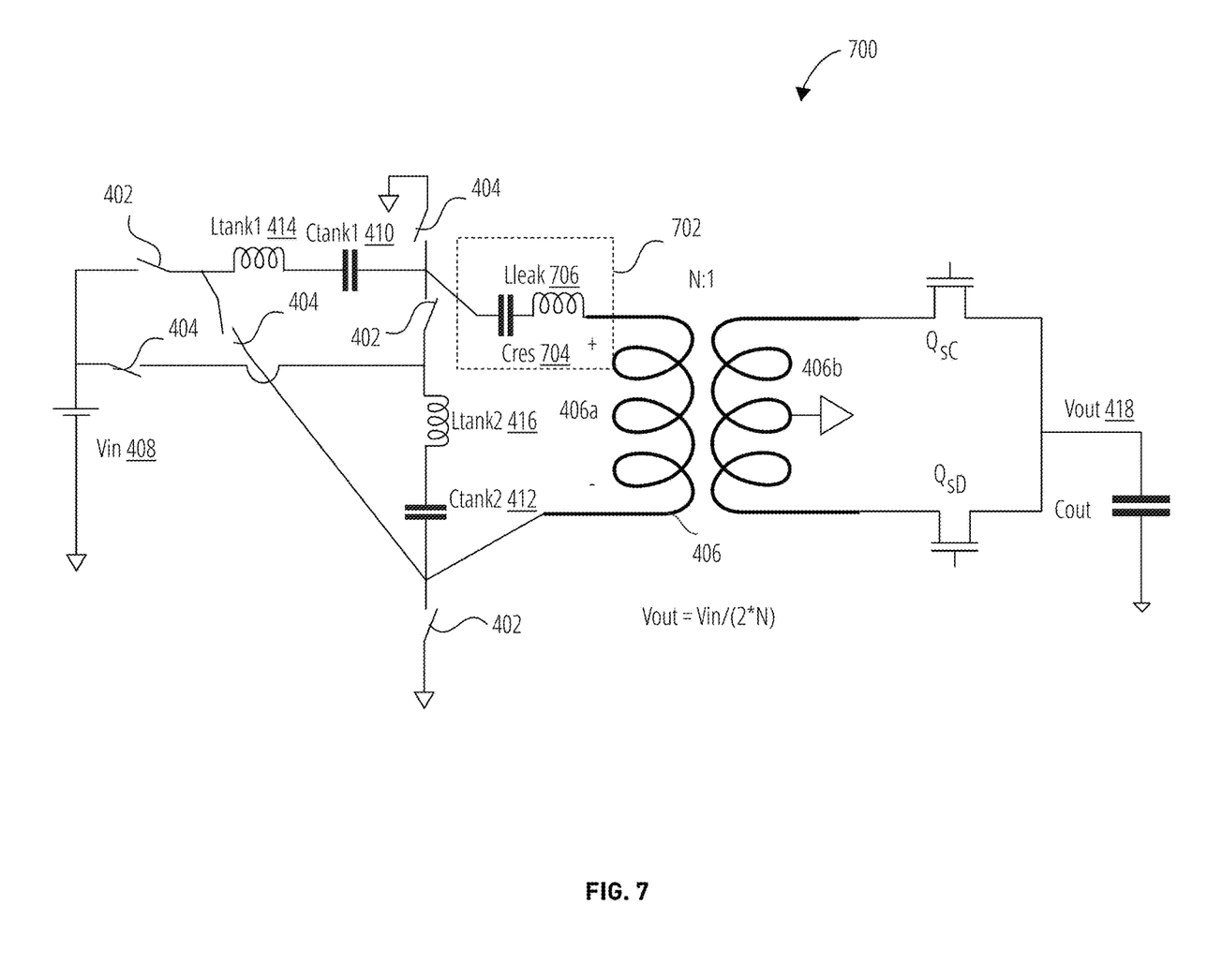
FIG. 7 illustrates a switch tank transformer DC-DC converter 700 in accordance with at least one embodiment.

FIG. 7 illustrates a switch tank transformer DC-DC converter 700 according to at least one embodiment. The switch tank transformer DC-DC converter 700 is similar to the switch tank transformer DC-DC converter 400 of FIG. 4. According to the embodiment(s) of FIG. 7, a leakage inductance (e.g., a leakage inductance of the transformer 406) is addressed.

With reference to FIG. 7, the leakage inductance of the transformer 406 is represented as an inductor 706 ($L_{leak}$). To tune out the leakage inductance of the transformer 406, a capacitor 704 ($C_{res}$) is provided. As illustrated in FIG. 7, the capacitor 704 is coupled between the tank circuit (inductor 414 and capacitor 410, and/or inductor 416 and capacitor 412) and a positive terminal of the transformer primary winding 406a. According to at least one embodiment, the capacitor 704 is tuned to series resonate with the inductor 706 at the switching frequency described earlier with reference to FIG. 5. Accordingly, the capacitor 704 and the inductor 706 effectively form an LC circuit 702 having a resonant frequency equal (or approximately equal) to the switching frequency. Providing the capacitor 704 to cancel out the leakage inductance of the transformer 406 has little to no impact on efficiency.

Figure 8:
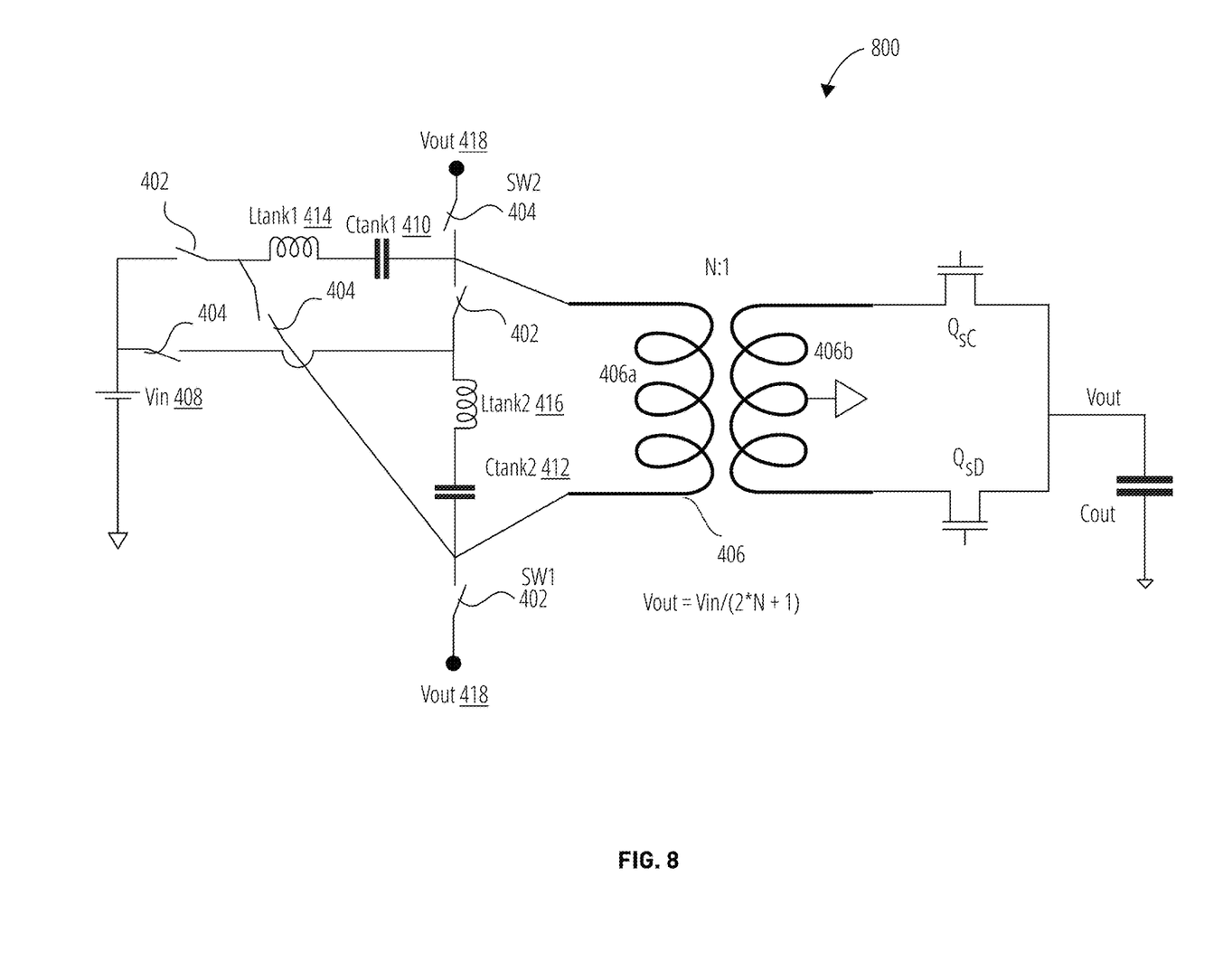
FIG. 8 illustrates a switch tank transformer DC-DC converter 800 in accordance with at least one embodiment.

FIG. 8 illustrates a switch tank transformer DC-DC converter 800 according to at least one embodiment. Operation of the switch tank transformer DC-DC converter 800 is similar to the operation of the switch tank transformer DC-DC converter 400, as described earlier with reference to FIG. 4 and FIG. 5. However, the conversion ratio provided by the switch tank transformer DC-DC converter 800 is different from that provided by the switch tank transformer DC-DC converter 400.

FIG. 8 illustrates that the respective source terminals of two switches are coupled to the voltage output 418. In more detail, the source terminal of the first switch 402 (SW1) is coupled to the voltage output 418, rather than to ground. Similarly, the source terminal of the second switch 404 (SW2) is coupled to the voltage output 418, rather than to ground. In this manner, the conversion ratio is increased such that the value of the voltage at the voltage output 418 is equal to $V_{in}/(2*N+1)$, rather than $V_{in}/(2*N)$.

Figure 9:
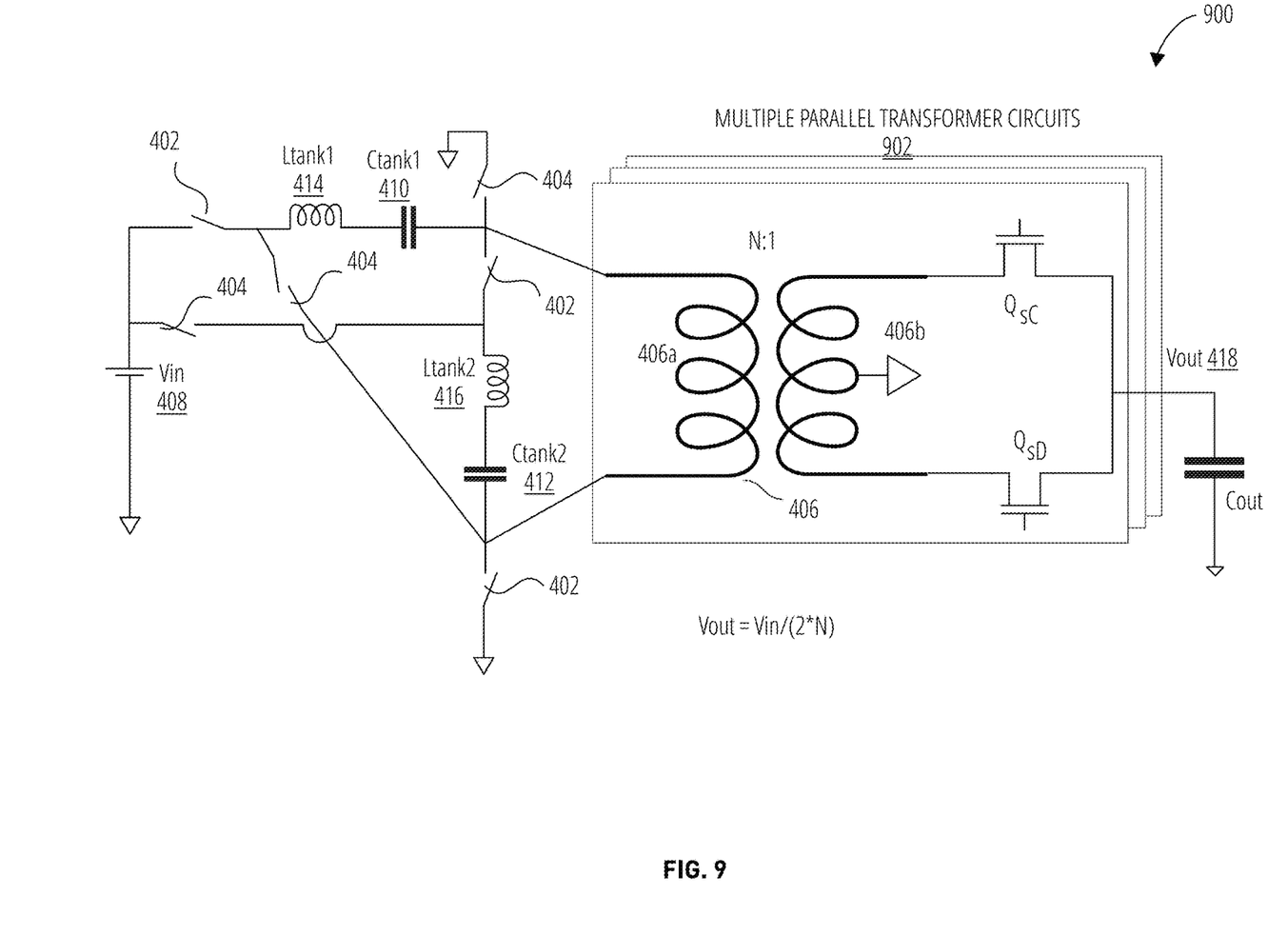
FIG. 9 illustrates a switch tank transformer DC-DC converter 900 utilizing multiple transformers in accordance with at least one embodiment.

FIG. 9 illustrates a switch tank transformer DC-DC converter 900 according to at least one embodiment. Operation of the switch tank transformer DC-DC converter 900 is similar to the operation of the switch tank transformer DC-DC converter 400, as described earlier with reference to FIG. 4 and FIG. 5. With reference to FIG. 9, if the output current is large, a transformer (e.g., similar to the transformer 406 of FIG. 4) may include multiple parallel transformer circuits 902. For example, each of the multiple parallel transformer circuits 902 may have the same (or similar) characteristics as the transformer 406. Accordingly, the switch tank transformer DC-DC converter 900 includes a single switched tank converter coupled to each of the multiple parallel transformer circuits 902, as illustrated in FIG. 9.

Figure 10:
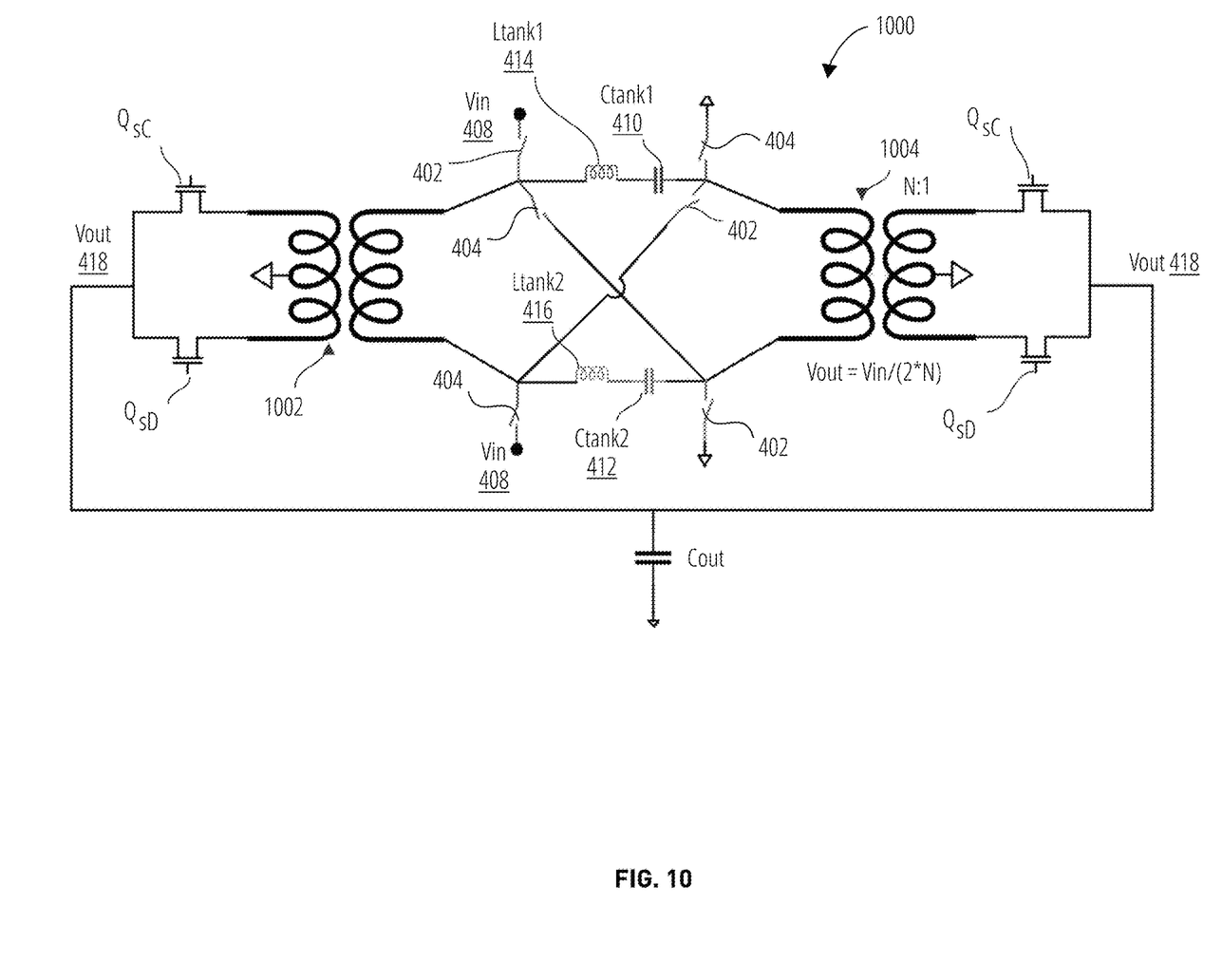
FIG. 10 illustrates a symmetric switch tank transformer DC-DC converter 1000 in accordance with one embodiment.

FIG. 10 illustrates a symmetric switch tank transformer DC-DC converter 1000 in one embodiment. Transformer 1002 and transformer 1004 are coupled to increase the load current capacity of the circuit. Compared to the switch tank transformer DC-DC converter 900 in FIG. 9, this implementation is more symmetric. The voltage across transformer 1004 is ($V_{in}/2$, 0) i.e. $+V_{in}/2$ and the voltage across transformer 1002 is ($V_{in}$, $V_{in}/2$) i.e. $+V_{in}/2$ in phase when the first switches 402 are ON. During the next phase when the second switches 404 are ON, the voltage across the transformer 1002 and transformer 1004 are (0,) i.e. $V_{in}/2$ and ($V_{in}/2$, $V_{in}$) i.e. $V_{in}/2$ respectively. The secondary side of both of transformer 1002 and transformer 1004 are coupled in parallel to obtain the desired voltage.

Figure 11:
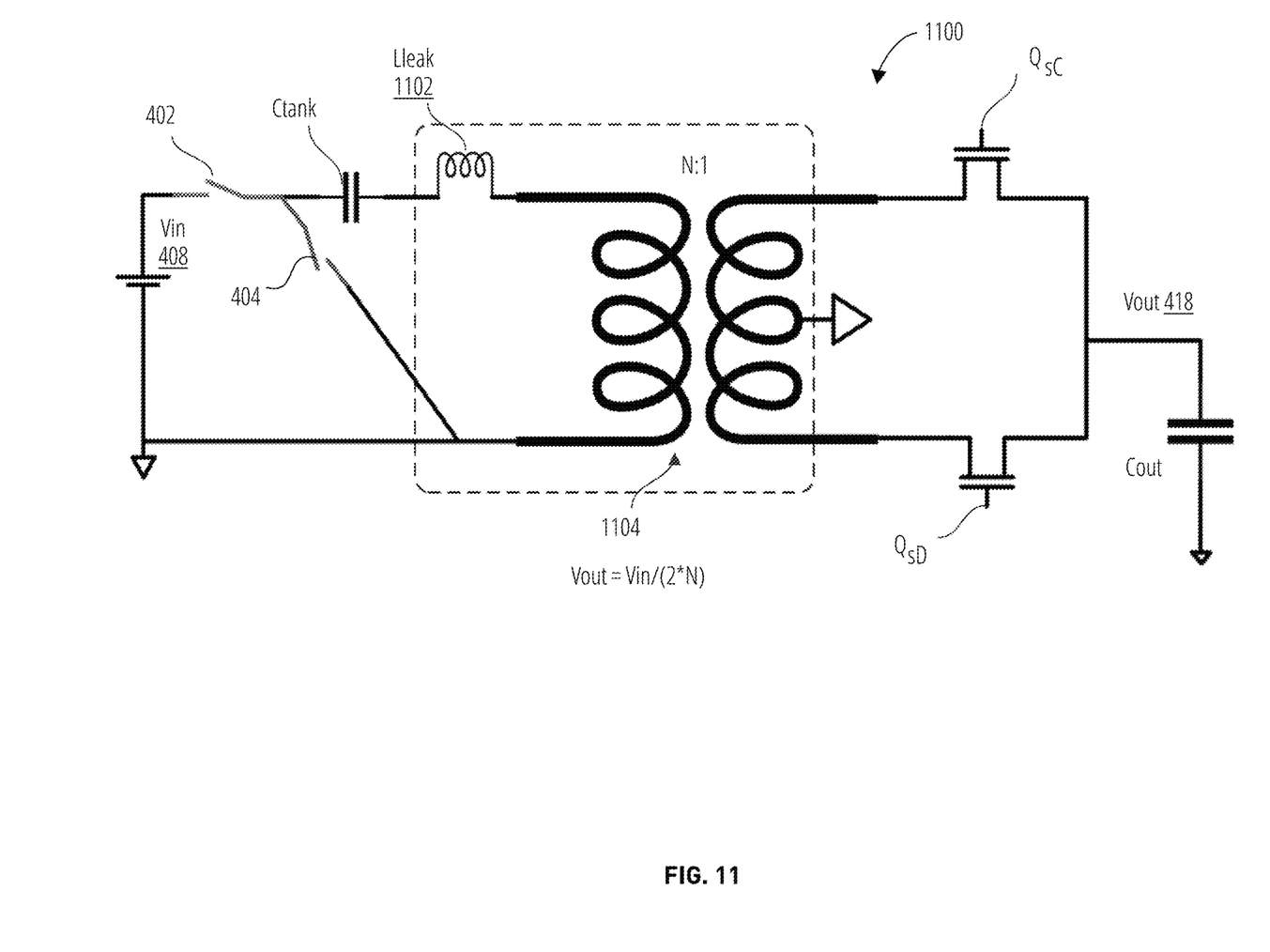
FIG. 11 illustrates a reduced component switch tank transformer DC-DC converter 1100 in accordance with one embodiment.

FIG. 11 illustrates a reduced component switch tank transformer DC-DC converter 1100 in one embodiment. The component count is reduced by utilizing the leakage inductance 1102 of the transformer 1104 as the tank inductance. Only two switches and one capacitor are utilized on the primary side of the transformer 1104.

Figure 12:
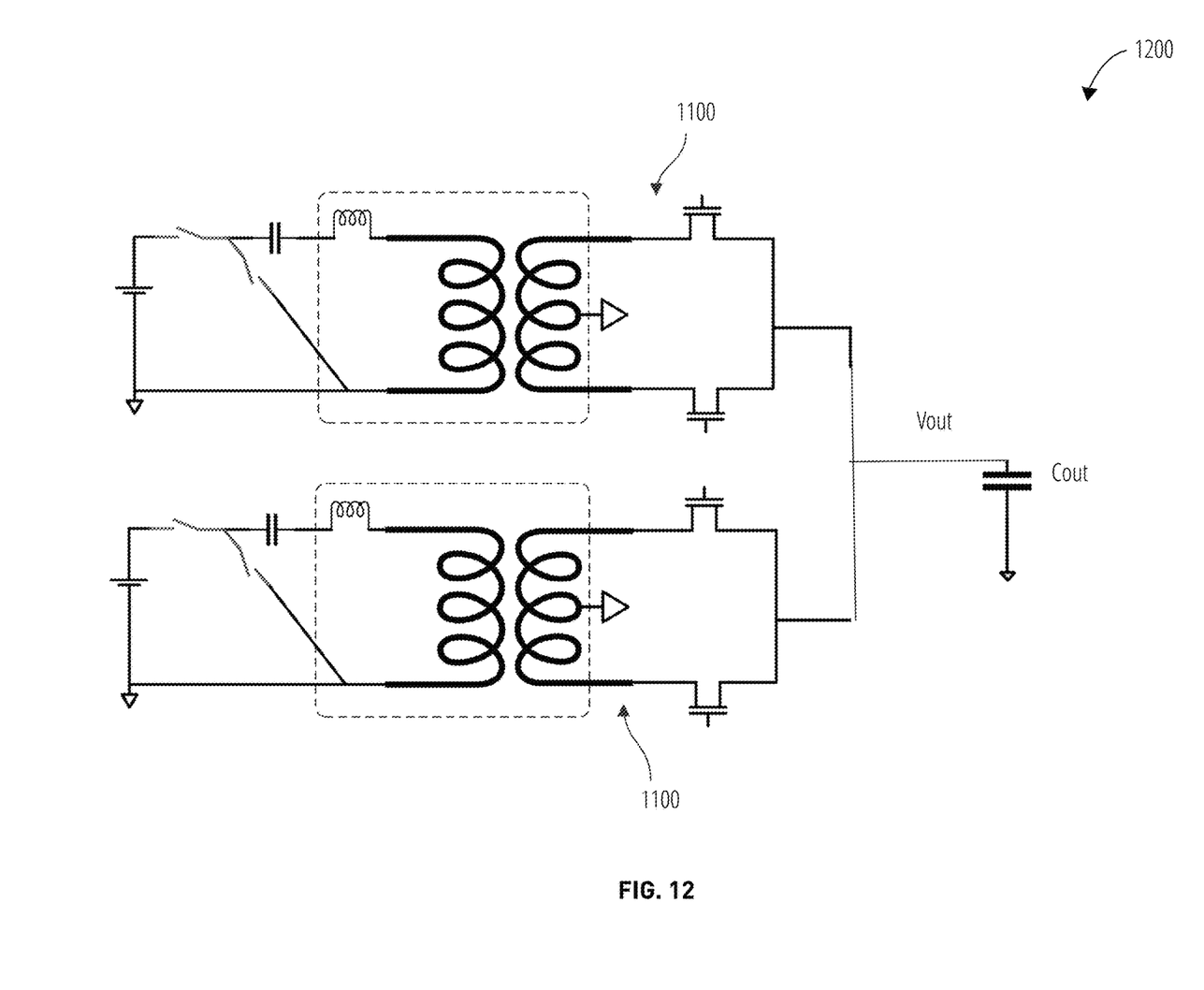
FIG. 12 illustrates an interleaved switch tank transformer DC-DC converter 1200 in accordance with one embodiment.

A drawback of the reduced component switch tank transformer DC-DC converter 1100 is that the current is drawn from voltage input 408 only during one half cycle which increases the input current transients. To mitigate this problem, an interleaved switch tank transformer DC-DC converter 1200 implementation as shown in FIG. 12 draws current during both the phases of operation to reduce input current transients. In the interleaved switch tank transformer DC-DC converter 1200, the top and bottom stages operate in complementary phases so as to ensure current is drawn during the entire cycle of the voltage input 408.

Figure 13:
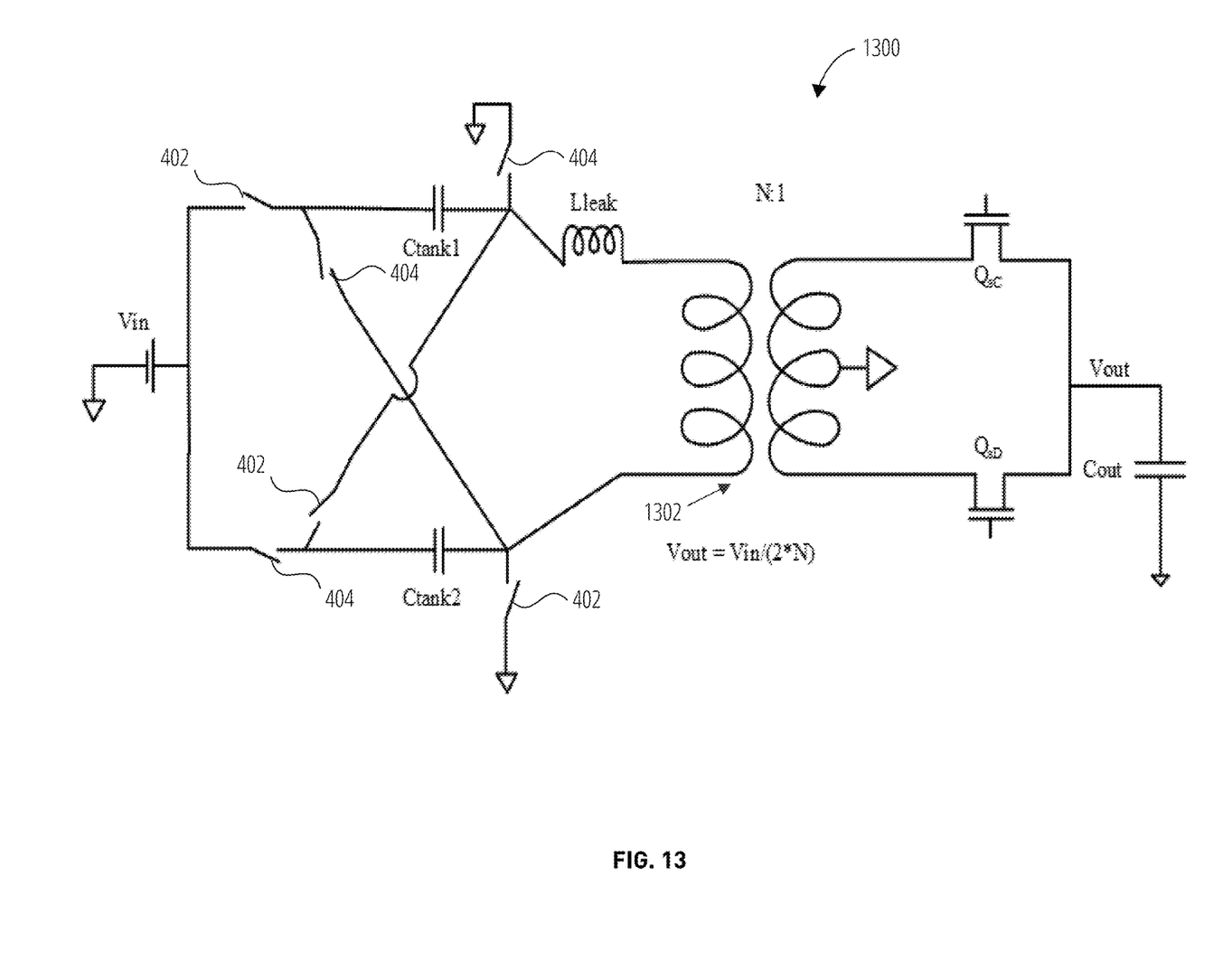
FIG. 13 illustrates a reduced component switch tank transformer DC-DC converter 1300 in accordance with one embodiment.

FIG. 13 illustrates a reduced component switch tank transformer DC-DC converter 1300 in one embodiment. The resonant tank is formed using the leakage inductor ($L_{leak}$) of the transformer 1302. The inductors in the tank utilized in the previously illustrated implementations are absent in the reduced component switch tank transformer DC-DC converter 1300. The resonant action of the switched capacitors ($C_{tank1}$, $C_{tank2}$) along with the leakage inductance $L_{leak}$ of tank reduces the switching losses and achieves high efficiency. The reduced component switch tank transformer DC-DC converter 1300 has two phase operation and draws current in both phases of the switching cycle. The reduced component switch tank transformer DC-DC converter 1300 achieves a conversion ratio of $V_{out}=V_{in}/(2N)$, where the switched capacitive converter action provides a conversion factor of two, and the additional N conversion factor is provided by the transformer 1302.

Figure 14:
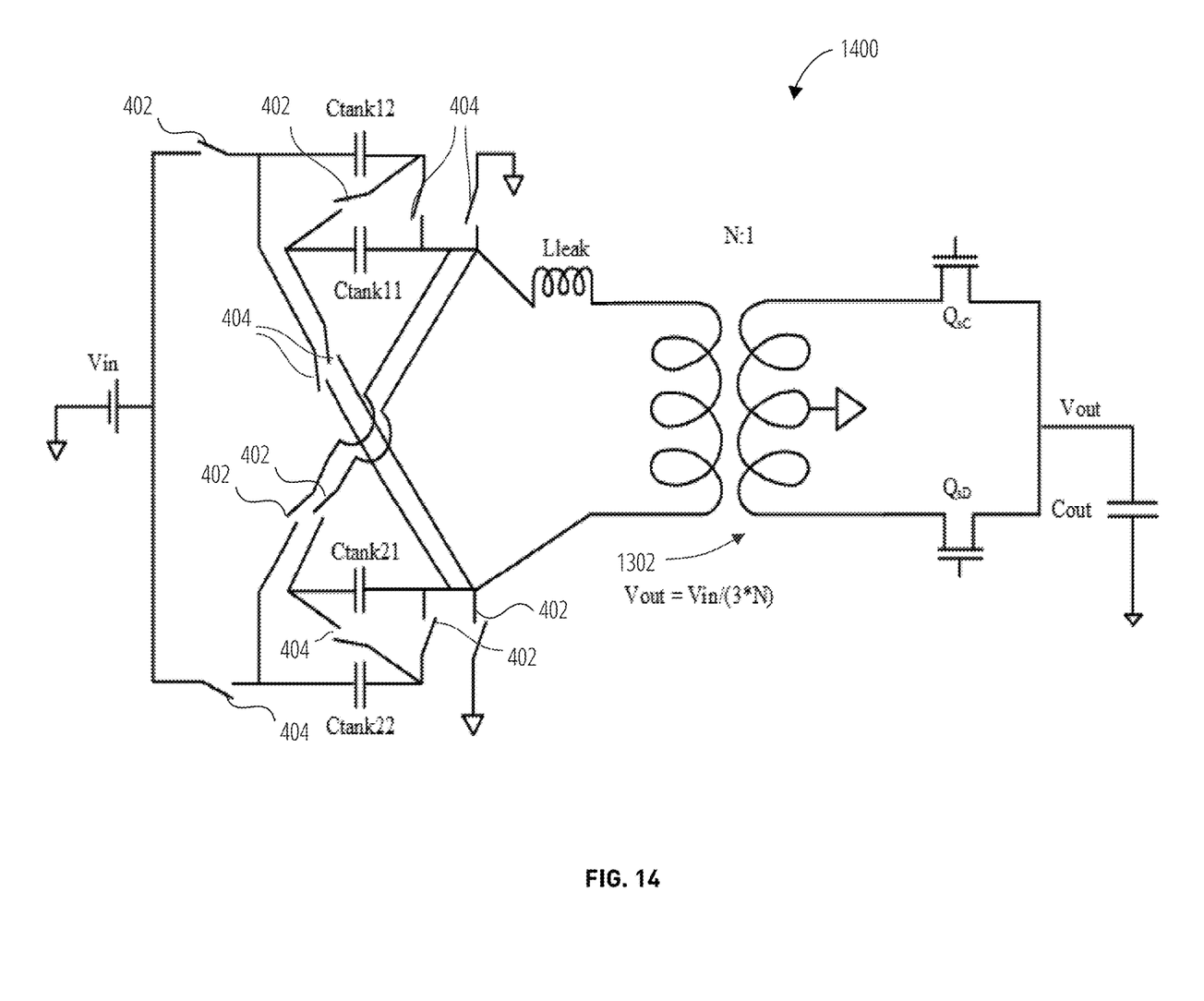
FIG. 14 illustrates a higher conversion ratio switch tank transformer DC-DC converter 1400 in accordance with one embodiment.

FIG. 14 illustrates a higher conversion ratio switch tank transformer DC-DC converter 1400 utilizing techniques from the reduced component switch tank transformer DC-DC converter 1300. The switched capacitors ($C_{tank1}$1, $C_{tank1}$2, $C_{tank2}$1, $C_{tank2}$2) provide a conversion factor of three by series connection in one of the phases of the switching cycle, and parallel connection in the complementary phase. Together with the transformer 1302 the higher conversion ratio switch tank transformer DC-DC converter 1400 achieves $V_{out}=V_{in}/(3N)$. The higher conversion ratio switch tank transformer DC-DC converter 1400 has two phase action drawing current during the entire switching cycle. The number of capacitors and switches is increased as compared to the reduced component switch tank transformer DC-DC converter 1300, and thus the overall circuit loss may be higher than in the reduced component switch tank transformer DC-DC converter 1300.

"Logic" is used herein to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

What is claimed is:

1. A DC-DC converter circuit comprising:
   a switched tank converter configured to output a switching waveform;
   a transformer coupled to the switched tank converter to receive the switching waveform output by the switched tank converter across a primary winding of the transformer; and
   wherein the switched tank converter comprises an interleaved switch tank converter.

2. The DC-DC converter circuit of claim 1, wherein the switched tank converter provides a portion of a conversion ratio of the DC-DC converter circuit, and the transformer provides a remaining portion of the conversion ratio.

3. The DC-DC converter circuit of claim 1, wherein the interleaved switch tank converter comprises a first tank circuit, a second tank circuit, and a plurality of switches for coupling the first tank circuit and the second tank circuit.

4. The DC-DC converter circuit of claim 3, wherein the first tank circuit comprises a first inductor and a first capacitor coupled to the first inductor, and wherein the second tank circuit comprises a second inductor and a second capacitor coupled to the second inductor.

5. The DC-DC converter circuit of claim 1, further comprising a resonant capacitor tuned to series resonate with a leakage inductance of the transformer at a switching frequency of the switching waveform.

6. The further of claim 1, wherein the transformer comprises a plurality of transformer circuits coupled in parallel.

7. A system comprising:
   a DC-DC converter configured to receive an input signal and generate an output signal, wherein the DC-DC converter comprises:
   a switched tank converter configured to output a switching waveform;
   a transformer coupled to the switched tank converter to receive the switching waveform output by the switched tank converter across a primary winding of the transformer;
   a synchronous rectifier coupled to the DC-DC converter and configured to rectify the output signal generated by the DC-DC converter;
   an integrated circuit (IC) device coupled to the synchronous rectifier to receive the rectified output signal; and
   wherein the switched tank converter comprises an interleaved switch tank converter.

8. The system of claim 7, wherein the switched tank converter provides a portion of a conversion ratio of the DC-DC converter, and the transformer provides a remaining portion of the conversion ratio.

9. The system of claim 8, wherein the interleaved switch tank converter comprises a first tank circuit, a second tank circuit, and a plurality of switches for coupling the first tank circuit and the second tank circuit.

10. The system of claim 9,
    wherein the first tank circuit comprises a first inductor and a first capacitor coupled to the first inductor, and
    wherein the second tank circuit comprises a second inductor and a second capacitor coupled to the second inductor.

11. The system of claim 7, wherein the DC-DC converter further comprises a resonant capacitor tuned to series resonate with a leakage inductance of the transformer at a switching frequency of the switching waveform.

12. The system of claim 7, wherein the transformer comprises a plurality of transformer circuits coupled in parallel.

13. A method of operating a converter circuit comprising a switched tank converter and a transformer coupled to the switched tank converter, the method comprising:
    receiving an input signal at the switched tank converter;
    during a first phase, controlling the switched tank converter to apply a voltage of a first polarity across a primary winding of the transformer;
    during a second phase, controlling the switched tank converter to apply a voltage of a second polarity across the primary winding of the transformer, wherein the second polarity is opposite of the first polarity;
    providing an output signal at a secondary winding of the transformer; and
    the converter circuit drawing current from the input signal during both the first phase and the second phase.

14. The method of claim 13, wherein controlling the switched tank converter to apply the voltage of the first polarity across the primary winding comprises controlling a plurality of first switches to be on and controlling a plurality of second switches to be off.

15. The method of claim 14, wherein controlling the switched tank converter to apply the voltage of the second polarity across the primary winding comprises controlling the plurality of first switches to be off and controlling the plurality of second switches to be on.

16. The method of claim 13, wherein the switched tank converter provides a portion of a conversion ratio of the converter circuit, and the transformer provides a remaining portion of the conversion ratio.

17. The method of claim 13, wherein controlling the switched tank converter to apply the voltage of the first polarity during the first phase and controlling the switched tank converter to apply the voltage of the second polarity during the second phase cause a switching waveform to be applied across the primary winding of the transformer.

* * * * *